United States Patent
Kang et al.

(10) Patent No.: US 9,292,714 B2
(45) Date of Patent: Mar. 22, 2016

(54) STORAGE DEVICE AND HOST DEVICE FOR PROTECTING CONTENT AND METHOD THEREOF

(75) Inventors: Bo-Gyeong Kang, Gyeonggi-do (KR); Byung-Rae Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/540,053

(22) Filed: Jul. 2, 2012

(65) Prior Publication Data
US 2013/0007468 A1    Jan. 3, 2013

(30) Foreign Application Priority Data

Jun. 30, 2011 (KR) .................. 10-2011-0065086
Jun. 29, 2012 (KR) .................. 10-2012-0071190

(51) Int. Cl.
*G06F 21/00* (2013.01)
*G06F 21/79* (2013.01)

(52) U.S. Cl.
CPC ........ *G06F 21/79* (2013.01); *G06F 2221/2107* (2013.01); *G06F 2221/2141* (2013.01)

(58) Field of Classification Search
CPC ............ G06F 21/79; G06F 2221/2141; G06F 2221/2107
See application file for complete search history.

(56) References Cited

U.S. PATENT DOCUMENTS

| 6,615,192 B1* | 9/2003 | Tagawa ................. G06Q 30/02 705/50 |
| 2002/0101989 A1* | 8/2002 | Markandey ............ H04N 5/913 380/210 |
| 2003/0007640 A1* | 1/2003 | Harada et al. ................. 380/270 |
| 2003/0033537 A1* | 2/2003 | Fujimoto et al. .............. 713/193 |
| 2004/0064485 A1* | 4/2004 | Yoshida et al. ............... 707/201 |
| 2005/0025316 A1 | 2/2005 | Pelly et al. |
| 2005/0060544 A1 | 3/2005 | Huang et al. |
| 2005/0091491 A1* | 4/2005 | Lee et al. ...................... 713/167 |
| 2006/0239453 A1* | 10/2006 | Halpern ......................... 380/45 |
| 2006/0242064 A1* | 10/2006 | Jogand-Coulomb et al. ... 705/50 |
| 2007/0009232 A1* | 1/2007 | Muraki ............ G11B 20/00768 386/257 |
| 2007/0016956 A1* | 1/2007 | Bellwood et al. ............... 726/26 |
| 2007/0074294 A1 | 3/2007 | Yoon et al. |
| 2007/0110227 A1* | 5/2007 | Yokouchi ......... G11B 20/00086 380/28 |
| 2007/0160209 A1 | 7/2007 | Kasahara et al. |

(Continued)

FOREIGN PATENT DOCUMENTS

| EP | 1505594 | 2/2005 |
| KR | 10-0713491 | 4/2007 |

(Continued)

OTHER PUBLICATIONS

European Search Report dated Mar. 30, 2015 issued in counterpart application No. 12805222.2-1853.

(Continued)

*Primary Examiner* — Michael Pyzocha
(74) *Attorney, Agent, or Firm* — The Farrell Law Firm, P.C.

(57) ABSTRACT

A storage device for protecting content, includes a Secure Area (SA) area in which a decryption key needed to decrypt encrypted content is stored, and access to which is available to a host device that has passed authentication using a secure authentication protocol. The storage device stores a security information file for mapping control information for controlling usage of the encrypted content and the decryption key to the encrypted content.

15 Claims, 7 Drawing Sheets

(56) References Cited

U.S. PATENT DOCUMENTS

| | | | |
|---|---|---|---|
| 2007/0198858 A1* | 8/2007 | Kim et al. | 713/193 |
| 2007/0300078 A1* | 12/2007 | Ochi et al. | 713/189 |
| 2008/0120242 A1* | 5/2008 | Krig et al. | 705/59 |
| 2008/0256640 A1* | 10/2008 | Tobita et al. | 726/26 |
| 2009/0013190 A1* | 1/2009 | Benhammou et al. | 713/185 |
| 2009/0034733 A1 | 2/2009 | Raman et al. | |
| 2009/0089589 A1* | 4/2009 | Tobita ............ G11B 20/00086 713/190 | |
| 2009/0319791 A1* | 12/2009 | Aiyoshi et al. | 713/169 |
| 2010/0299522 A1* | 11/2010 | Khambete | 713/168 |
| 2011/0179288 A1* | 7/2011 | Catrein et al. | 713/189 |
| 2012/0317379 A1* | 12/2012 | Ali et al. | 711/158 |
| 2013/0007468 A1* | 1/2013 | Kang et al. | 713/189 |
| 2013/0191626 A1* | 7/2013 | Kuno et al. | 713/150 |

FOREIGN PATENT DOCUMENTS

| | | |
|---|---|---|
| WO | WO 2006/069194 | 6/2006 |
| WO | WO 2010/031413 | 3/2010 |

OTHER PUBLICATIONS

Chinese Office Action dated Jul. 2, 2015 issued in counterpart application No. 201280032508.9, 17 pages.

* cited by examiner

| Item | Description | M/O |
|---|---|---|
| Title | TITLE OF CONTENT A | O |
| Control file identifier | IDENTIFIER FOR IDENTIFYING AND MAPPING CONTROL FILE | M |
| Title key identifier | ADDRESS INFORMATION FOR ACQUIRING TITLE KEY | M |
| Initial Vector | INITIAL VECTOR FOR CONTENT DECRYPTION AND ASSOCIATED CONTENT START POSITION INFORMATION | O |

STORAGE DEVICE AND HOST DEVICE FOR PROTECTING CONTENT AND METHOD THEREOF

PRIORITY

This application claims priority under 35 U.S.C. §119(a) to Korean Patent Applications filed in the Korean Intellectual Property Office on Jun. 30, 2011 and Jun. 29, 2012 and assigned Serial Nos. 10-2011-0065086 and 10-2012-0071190, the entire disclosure of which is incorporated herein by reference.

BACKGROUND OF THE INVENTION

1. Field of the Invention

The present invention relates generally to a device and method for protecting content, and more particularly, to a storage device, a host device and a corresponding method for securely storing and playing content.

2. Description of the Related Art

Content protection technology aims to securely deliver a variety of content from Content Providers (CPs) to users, and to prevent users, who have received content, from illegally distributing the content. Content protection technology may protect information throughout an entire process that includes creation, distribution, usage and disposal of digital content. Content protection technology may also protect the rights of users, both online and offline.

Content protection technology may include, for example, Digital Rights Management (DRM) technology, Content Protection for Recordable Media (CPRM), and Advanced Access Content System (AACS) specification. A content protection approach also exists that encrypts and provides content itself, provides control information for controlling usage of encrypted content, and provides an encryption/decryption key for decrypting the encrypted content.

According to this content protection approach, an entity consuming content (hereinafter referred to as a 'host'), such as a content playback device, receives control information corresponding to encrypted content and an encryption/decryption key. The host decrypts the encrypted content based on the control information and the encryption/decryption key. The host may receive the encrypted content, the control information and the encryption/decryption key from a storage device having a Secure Area (SA), access to which is available to the host, after the host has passed authentication. In contrast, the host may receive the encrypted content separate from the control information and the encryption/decryption key, which are received from a storage device having an SA. The storage device may be a Non-Volatile Memory (NVM) device having an SA, such as, for example, a Secure Digital (SD) card and a Universal Serial Bus (USB) memory.

As described above, conventional content protection technology provides content that is encrypted using a unique media identifier (ID) and its associated encryption technology (e.g., Public Key Infrastructure (PM) authentication). Conventional content protection technology maps the content or an encryption key used to encrypt the content, to the unique media ID, thereby preventing access to a storage area of a storage device, i.e., preventing an improper operation (reading, writing, etc.) for illegal replication of data.

However, conventional technology does not provide clear information for mapping encrypted content, control information and a decryption key, for consumption of the encrypted content.

Specifically, FIG. 1 shows encrypted content, control information for controlling usage of encrypted content, and decryption keys. Control information 121-123, which control usage of encrypted content, and decryption keys 111-11N may be stored in a storage device 100. In particular, the decryption keys 111-11N may be stored in separated areas SA1-SAn of an SA 110, respectively.

In order to consume or play each of the encrypted contents, such as Encrypted Content A 201, Encrypted Content B 202, and Encrypted Content C 203, a host, such as a content playback device, acquires associated control information and an encryption/decryption key from the storage device 100.

For example, to play the Encrypted Content A 201, the host acquires, from the storage device 100, 'Usage Information for A' for usage of Content A and 'Information bound to A' associated with Content A, which are included in control information '002.ctrl' for the Encrypted Content A 201. The host also acquires, from the SA area 110, an encryption/decryption key, 'Title key', corresponding to the 'Usage Information for A' and the 'Information bound to A', in order to consume or play the Encrypted Content A 201.

However, conventional technology does not provide information indicating the area in which a title key corresponding to the content is stored. Accordingly, when a title key is stored in the SA area 110, the host may not acquire the correct title key.

SUMMARY OF THE INVENTION

The present invention has been made to address at least the above problems and/or disadvantages and to provide at least the advantages described below. Accordingly, an aspect of the present invention provides a host device, a storage device and corresponding method for protecting content, configured to provide clear information for mapping encrypted content, control information for controlling usage of encrypted content, and an encryption/decryption key.

Another aspect of the present invention provides a host device and a storage device for protecting content, which are configured to generate an independent security information file including information for mapping control information for controlling usage of encrypted content and an encryption/decryption key, to encrypted content.

In accordance with one aspect of the present invention, a storage device is provided for protecting content. The storage device includes an SA in which a decryption key is stored. The decryption key is required to decrypt encrypted content. The storage device stores a security information file that maps control information for controlling usage of the encrypted content and the decryption key to the encrypted content. A host device is required to pass authentication using a secure authentication protocol to access the SA.

In accordance with another aspect of the present invention, a host device is provided for protecting content. The host device includes a content recording device for recording a security information file, which maps encrypted content, control information and a decryption key, in a storage device. The storage device stores the decryption key, which is required to decrypt the encrypted content, in a SA area. The host device is required to pass authentication using a secure authentication protocol to access the SA.

In accordance with an additional aspect of the present invention, a host device is provided for protecting content. The host device includes a content decryption device for acquiring a security information file to decrypt encrypted content, obtaining, from the security information file, information about control information and a decryption key corresponding to the encrypted content, acquiring the control information and the decryption key corresponding to the encrypted content from a storage device based on the information about the control information and the decryption key, and decrypting the encrypted content using the decryption key.

In accordance with a further aspect of the present invention, a method is provided for protecting content during storage of the content by a host device. Encrypted content, control information for controlling usage of the encrypted content, and a decryption key for the encrypted content, are stored in a storage device. A security information file that maps the encrypted content, the control information and the decryption key, is stored in the storage device.

In accordance with still another aspect of the present invention, a method is provided for protecting content during playback of the content in a host device. A security information file is acquired to decrypt encrypted content. Information about control information and a decryption key corresponding to the encrypted content are obtained from the security information file. The control information and the decryption key are acquired from a storage device based on the information about the control information and the decryption key. The encrypted content decrypted using the decryption key.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
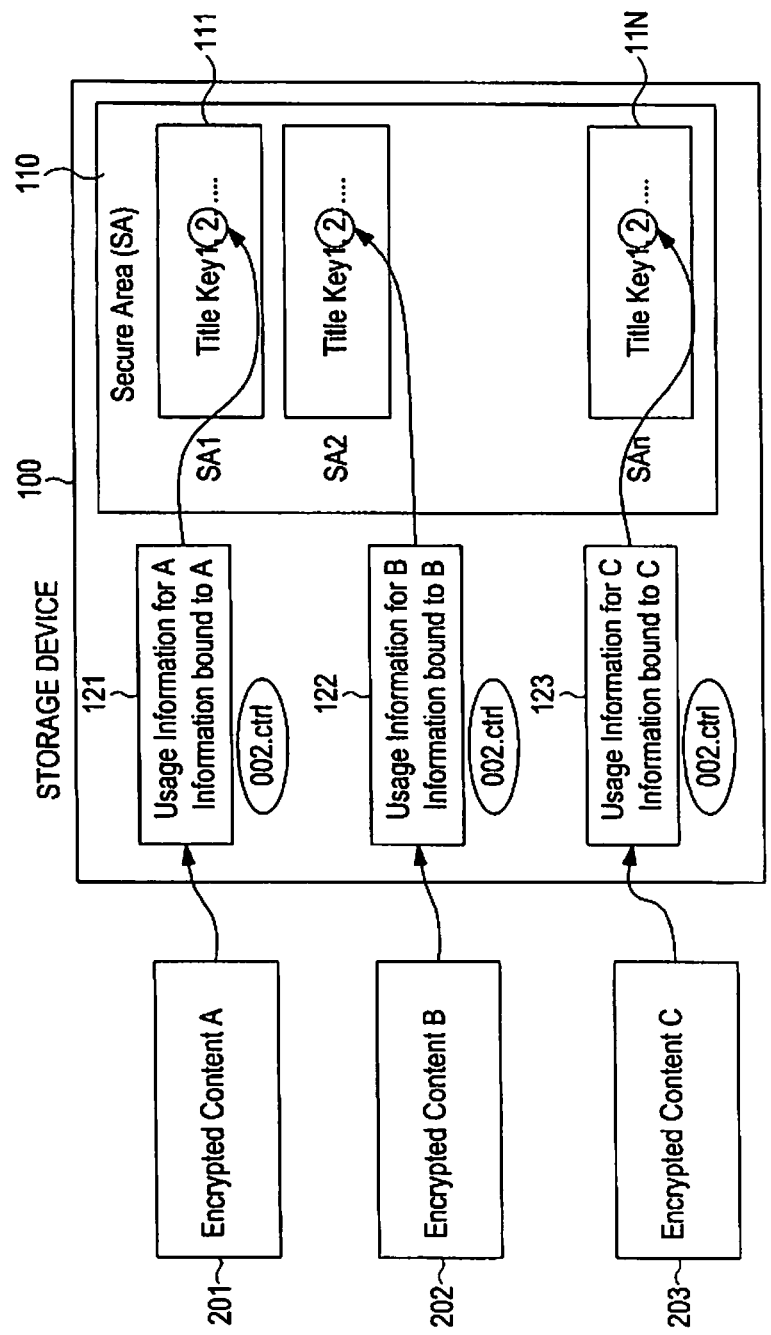
FIG. 1 is a diagram illustrating encrypted content, control information for controlling usage of encrypted content, and decryption keys.

Embodiments of the present invention are described in detail with reference to accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide a host device and a storage device for protecting content, and a method for protecting content using the host device and the storage device.

Figure 2:
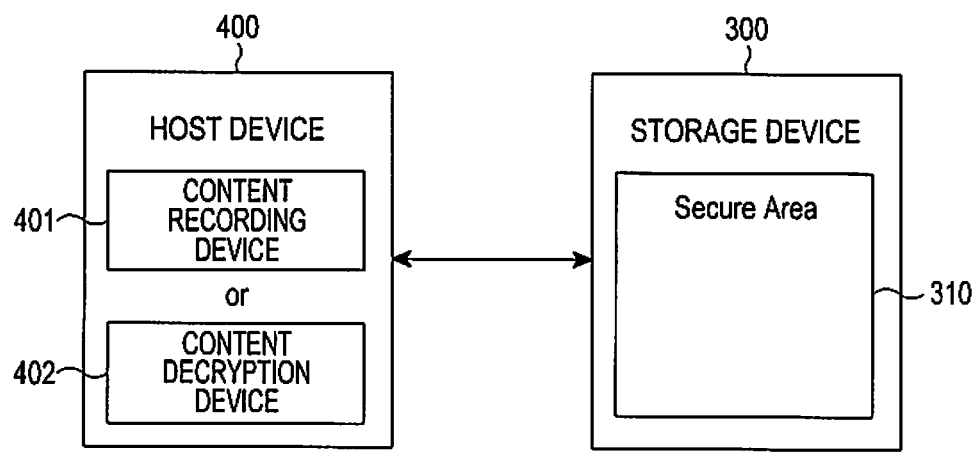
FIG. 2 is a diagram illustrating a host device and a storage device for protecting content, according to an embodiment of the present invention.

FIG. 2 is a diagram a host device and a storage device for protecting content, according to an embodiment of the present invention.

Referring to FIG. 2, a storage device 300 includes a non-volatile memory, such as, for example, an SD Card, a Solid-State Drive (SSD), a Hard Disk Drive (HDD), or a USB. The storage device 300 also has an SA 310. Access to the SA 310 is available to a host device that has passed authentication using a secure authentication protocol. The SA 310 may include a plurality of sub areas.

A host device 400 is a device that can access the storage device 300, and that can perform writing, reading, erasing, etc., in the storage device 300. The host device 400 may be embodied as a Digital Television (DTV), a smart phone or a Personal Computer (PC). The host device 400 may include a content recording device 401 for recording encrypted content stored in the storage device 300, or a content decryption device 402 for decrypting and playing encrypted content stored in the storage device 300.

When the host device 400 is the content recording device 401, the content recording device 401 records encrypted content, control information for controlling usage of the encrypted content, and at least one encryption/decryption key for the encrypted content, in the storage device 300. The content recording device 401 generates and records a Security Information File (SIF) for mapping the encrypted content, the control information, and the encryption/decryption key. The content recording device 401 records the encryption/decryption key in the SA 310.

When the host device 400 is the content decryption device 402, the content decryption device 402 acquires an SIF to decrypt encrypted content. The content decryption device 402 then acquires information on control information corresponding to the encrypted content and information about an encryption/decryption key, from the SIF. The content decryption device 402 acquires the control information and the encryption/decryption key from the information acquired from the SIF, and decrypts the encrypted content based on the acquired control information and encryption/decryption key. The content decryption device 402 may then play the decrypted content.

The host device 400 and the storage device 300 for protecting content, may provide an SIF including information on control information corresponding encrypted content and at least one encryption/decryption key. Thus, the host can more accurately acquire control information and an encryption/decryption key, when consuming or playing encrypted content.

Figure 3A:
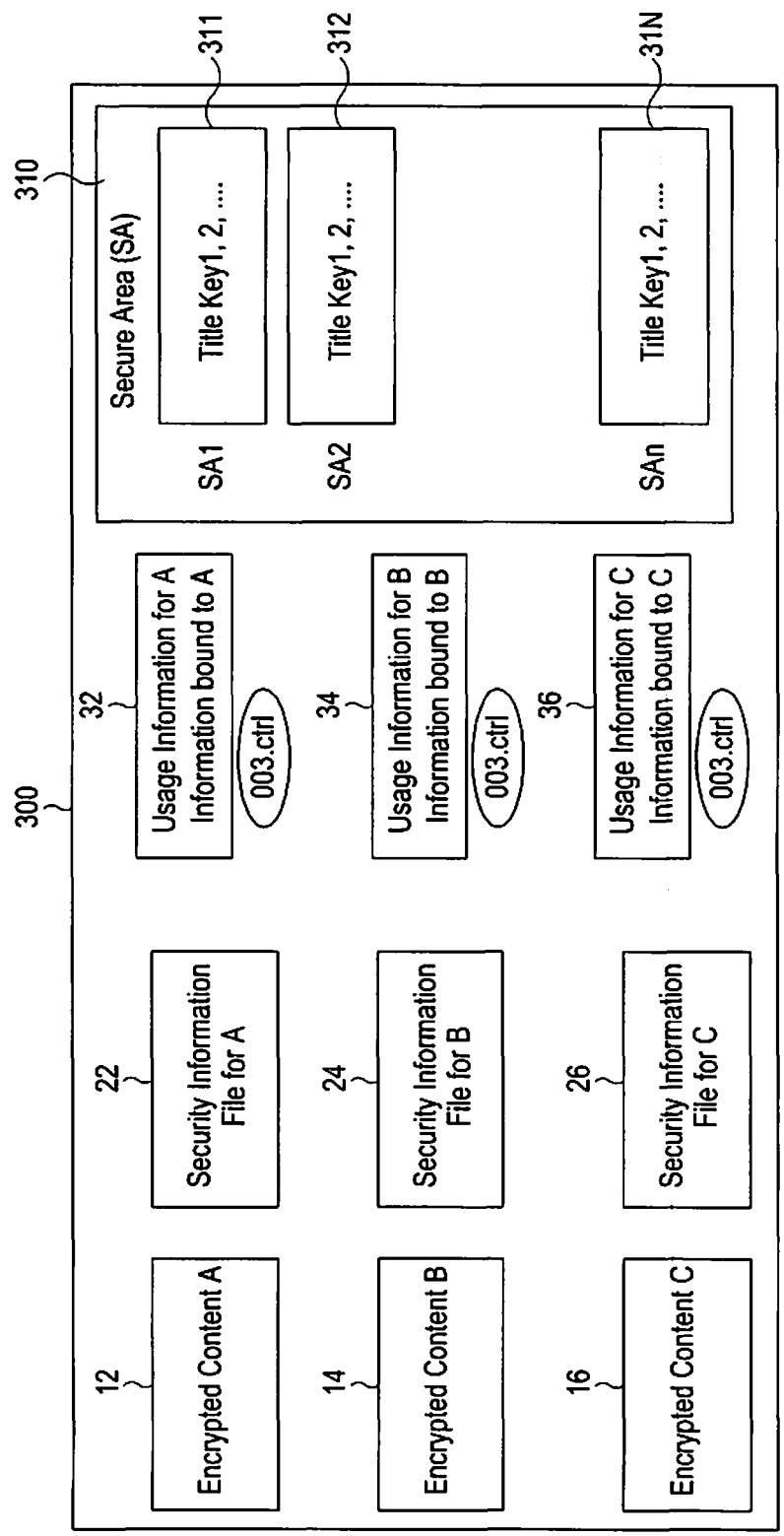
FIGS. 3A and 3B are diagrams illustrating encrypted content, control information, encryption/decryption keys, and security information files, according to an embodiment of the present invention.
Figure 3B:
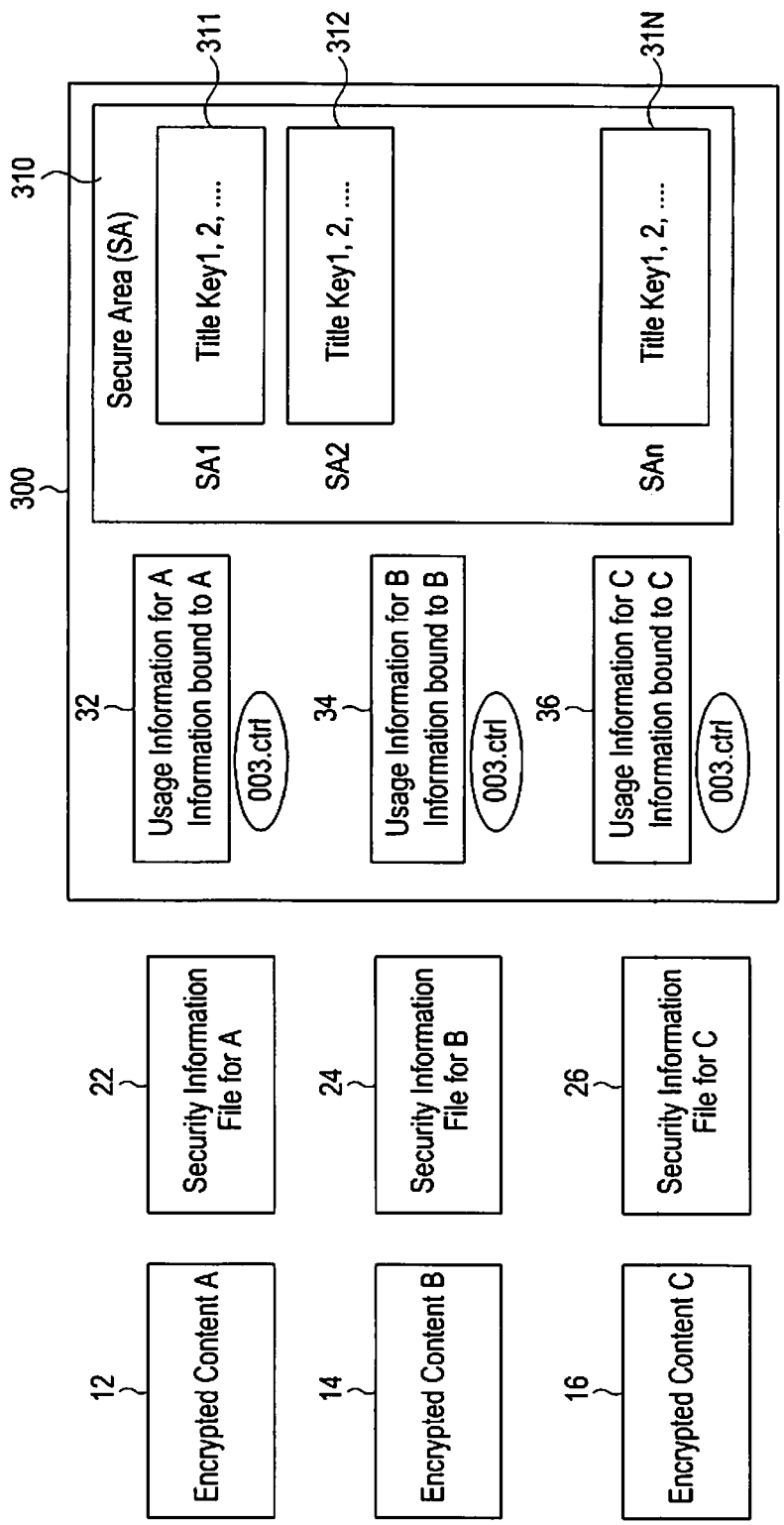

FIGS. 3A and 3B are diagrams illustrating encrypted content, control information, encryption/decryption keys, and SIFs, according to an embodiment of the present invention.

Referring to FIG. 3A, the host device 400 may record, in the storage device 300, encrypted content 12-16, control information '003.ctrl' 32-36 for controlling usage of the encrypted content 12-16, encryption/decryption keys 311-31N, and SIFs 22-26 including information on control information corresponding to encrypted content and information about encryption/decryption keys. The host device 400 may record the encryption/decryption keys 311-31N in separated areas SA1-SAn of the SA 310, respectively, access to which is available to the host after it has passed authentication.

Referring to FIG. 3B, the host device 400 may record the control information '003.ctrl' 32-36 for controlling usage of the encrypted content 12-16, and the encryption/decryption keys 311-31N in the storage device 300. The host device may separately provide the encrypted content 12-16 and the SIFs 22-26, which include information on control information corresponding to encrypted content and information about encryption/decryption keys.

The encrypted content is encrypted using an encryption key, and the control information '003.ctrl' includes 'Usage Information' for controlling usage of content, and information associated with content. The encryption/decryption key includes information about at least one Title key used for content encryption, or needed to decrypt encrypted content. The SIFs 22-26 include control information corresponding to encrypted content and information about encryption/decryption keys.

Specifically, the SIF may include security information corresponding to content (e.g., control information corresponding to encrypted content) and information about encryption/decryption keys, and may be created in a file, such as AAAAA.SIF, when the content is a file of AAAAA.MP4.

Figures 4, 5:
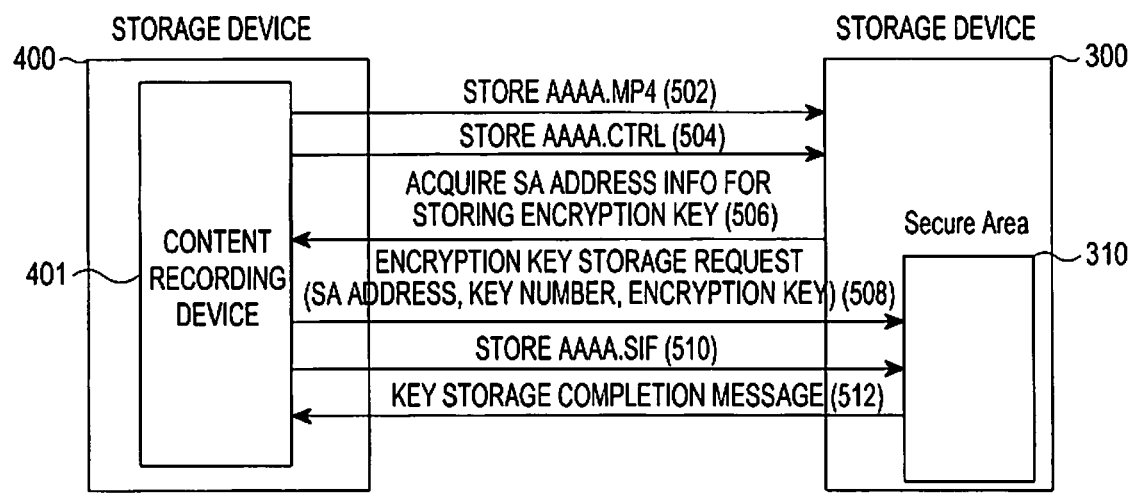
FIG. 4 is a table showing details of a security information file, according to an embodiment of the present invention.
FIG. 5 is a diagram illustrating a process of storing encrypted content, control information for controlling usage of encrypted content, an encryption/decryption key, and a security information file in a storage device by a host device, according to an embodiment of the present invention.

FIG. 4 is a table showing details of an SIF, according to an embodiment of the present invention. Referring to FIG. 4, the SIF may include items including a Title, a Control File Identifier, a Title Key Identifier, and an Initial Vector.

The Title item, which is a title of the content, may be segment information or an identifier for identifying content, and may be, for example, a name of the content. The Control File Identifier item, which is information indicating a Control File corresponding to individual content, may be an identifier for identifying control information corresponding to the content. An independent file name for identifying control information corresponding to the content may be used for the Control File Identifier item. When the independent file name is not used, an address, such as 'SA Address: xxx', indicating where the title key is stored, or a key number, such as 'key number: yyy', indicating which key should be acquired in a stored address, may be used. The Title Key Identifier item may be address information for acquiring the title key. The title key may include an address, such as 'SA Address: xxx', indicating where the title key is stored, and a key number, such as 'key number: yyy', indicating which key should be acquired in a stored address. The Initial Vector item may include an initial vector value needed for decryption of encrypted content, when content encryption is achieved using a Convert Base Station (CBS) mode of Advanced Encryption Standard (AES). Content start position information corresponding to an initial vector value may be included together with the initial vector value. For example, the Initial Vector item may include a chunk and its associated initial vector value, when content is encrypted on a chunk basis.

In accordance with an embodiment of the present invention, the Title, Control File Identifier, Title Key Identifier, and Initial Vector items of the SIF may be included in a Mandatory (M) or Optional (O) way. For example, the Control File Identifier and Title Key Identifier items may be preferably included in a Mandatory (M) way. The Title and Initial Vector items may be included in an Optional (O) way.

FIG. 5 is a diagram illustrating a process of storing encrypted content, control information for controlling usage of encrypted content, an encryption/decryption key, and an SIF, in the storage device 300, by the host device 400, according to an embodiment of the present invention.

Referring to FIG. 5, the host device 400 is embodied as the content recording device 401. The content recording device 401 stores an AAAA.MP4 file, or encrypted content, in the storage device 300, in step 502. The content recording device 401 stores an AAAA.Ctrl file, or control information, for controlling usage of encrypted content, in the storage device 300, in step 504. In step 506, the content recording device 401 acquires, from the storage device 300, information about an SA Address, where an encryption/decryption key for decryption of the encrypted content may be stored. Upon acquiring the information about an SA Address, the content recording device 401 requests storage of a key number and an encryption key at the SA Address, in step 508. Accordingly, the key number and the encryption key are recorded in the SA.

When the storage of the encrypted content, the control information and the encryption key is completed, the content recording device 401 generates an AAAA.SIF file, or an SIF, indicating information on control information corresponding to encrypted content and information on an encryption key. The content recording device stores the AAAA.SIF file in the storage device 300, in step 510. The AAAA.SIF file may include Title, Control File Identifier, Title Key Identifier, and Initial Vector items for the AAAA.MP4 file.

When the storage of the AAAA.SIF file is completed, the storage device 300 sends a key storage completion message to the content recording device 401 in step 512.

Thus, control information needed to consume encrypted content and a an SIF indicating information about an encryption/decryption key or indicating where it is stored, are stored in the storage device 300 together with encrypted content. A content decryption device or a content playback device desiring to consume encrypted content may easily acquire control information needed to consume encrypted content and an encryption/decryption key.

Figure 6:
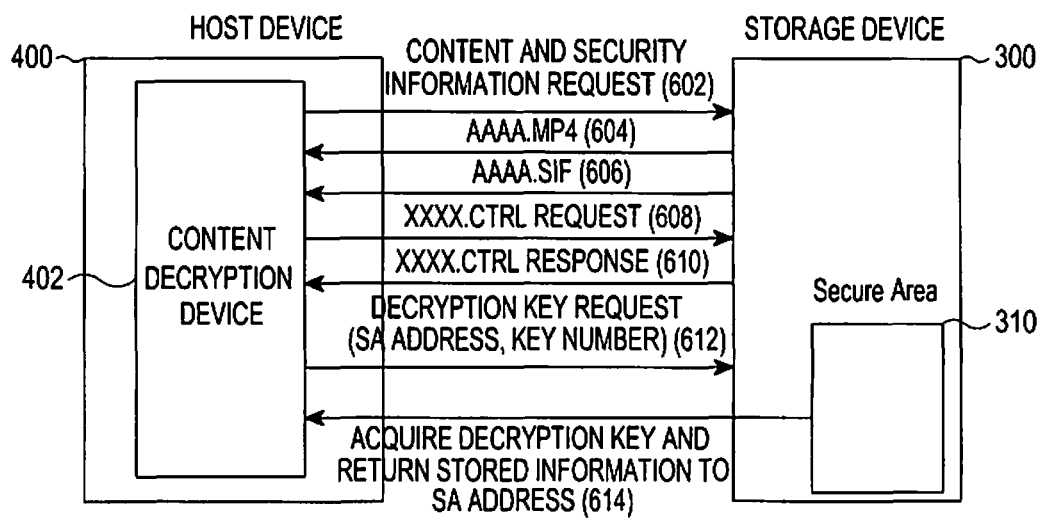
FIG. 6 is a diagram illustrating a process of acquiring encrypted content, control information for controlling usage of encrypted content, an encryption/decryption key, and a security information file, from a storage device, by a host device, according to an embodiment of the present invention.

FIG. 6 shows a process of acquiring encrypted content, control information for controlling usage of encrypted content, an encryption/decryption key, and a security information file, from the storage device 300, by the host device 400, according to an embodiment of the present invention.

Referring to FIG. 6, the host device 400 is embodied as the content decryption device 402. The content decryption device 402 requests content and security information from the storage device 300, in step 602. In response, the storage device 300 provides an AAAA.MP4 file, or encrypted content, to the content decryption device 402, in step 604. The storage device also provides an AAAA.SIF file, or an SIF, to the content decryption device 402, in step 606. The AAAA.SIF file includes information on control information corresponding to encrypted content and information about an encryption/decryption key.

The content decryption device 402 receives the AAAA.SIF file and acquires therefrom an address or an identifier for control information corresponding to encrypted content, an address for an encryption/decryption key, and key number information.

In step 608, the content decryption device 402 requests an XXXX.Ctrl file, or control information, for the AAAA.MP4 file from the storage device 300 using the address or identifier for control information, which is acquired from the AAAA.SIF file. In response to the request, the storage device 300 provides the XXXX.Ctrl file to the content decryption device 402, in step 610.

In step 612, the content decryption device 402 requests a decryption key from the storage device 300 using the address (SA Address) for an encryption/decryption key and the key number information, which are acquired from the AAAA.SIF.

In step 614, the storage device 300 acquires the requested decryption key from the SA 310 and provides the information stored at the SA address to the content decryption device 402.

Accordingly, the content decryption device 402 may acquire the acquired control information and encryption/decryption key, and decrypt and play the encrypted content using the acquired control information and encryption/decryption key.

Figure 7:
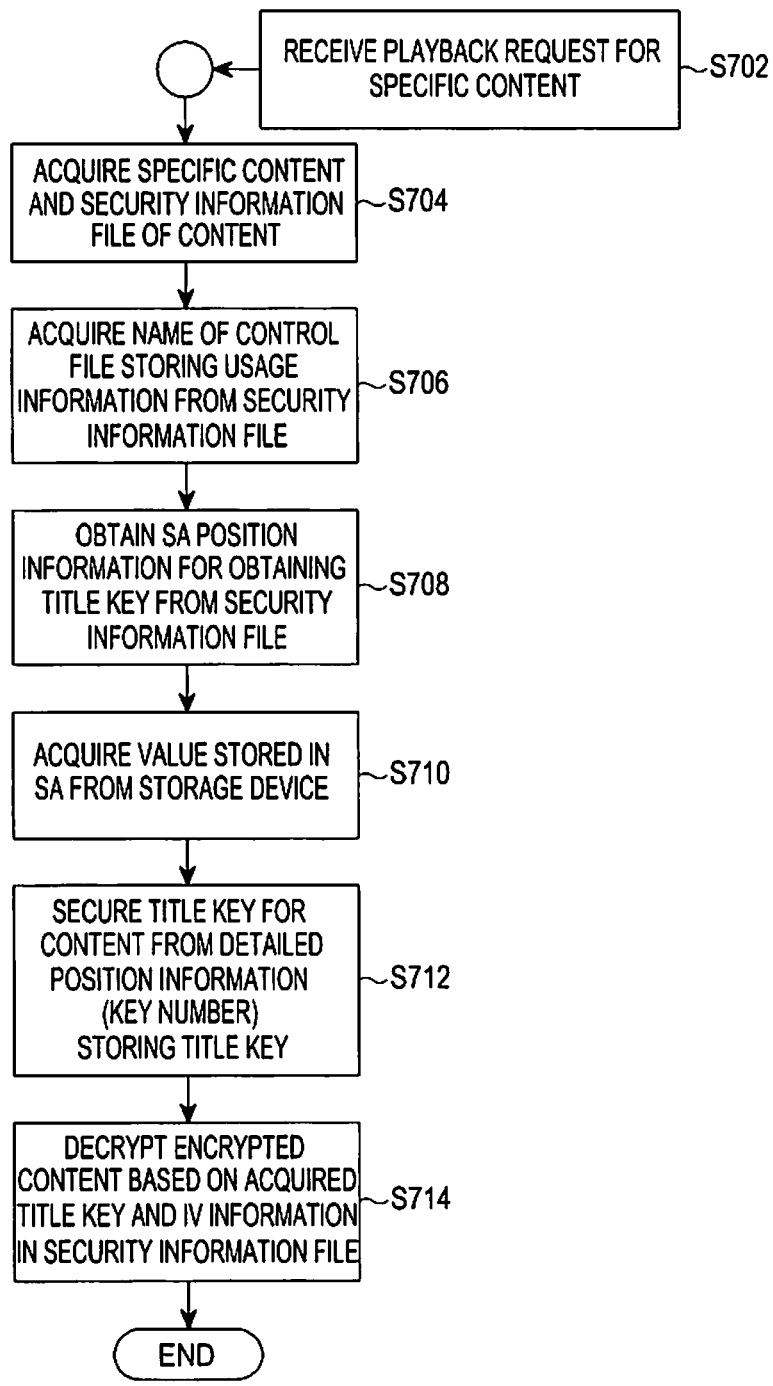
FIG. 7 is a flowchart illustrating a process of playing content in a host device, according to an embodiment of the present invention.

FIG. 7 is a flowchart illustrating a process of playing content in a host device, according to an embodiment of the present invention. Referring to FIG. 7, the host device 400 may be embodied as the a content playback device (not shown), including the content decryption device 402.

In step S702, the host device 400 receives a playback request for specific content. For example, a content playback command may be received from a user by means of an input device included in the host device 400.

In response to the request, the host device 400 acquires the specific content and an SIF for the content, in step S704. The host device 400 may acquire the specific content and the SIF for the content from the storage device 300 by requesting content and security information from the storage device 300.

In step S706, the host device 400 acquires a control file name corresponding to control information, which stores information such as usage information, from the acquired SIF. For example, the host device 400 obtains an address or an identifier for control information corresponding to the encrypted content from the SIF.

In step S708, the host device 400 obtains SA position information for obtaining a title key, from the acquired SIF. For example, the host device 400 obtains information about the SA address where the title key needed to decrypt the encrypted content is stored.

In step S710, the host device 400 acquires the title keys stored at the SA address of the storage device 300.

In step S712, the host device 400 acquires, from the storage device 300, a title key corresponding to a key number included in the SIF, from among the acquired title keys.

In step S714, the host device 400 decrypts and plays encrypted content using the acquired title key and an initial vector included in the SIF.

As is apparent from the foregoing description, when encryption/decryption keys for decrypting encrypted content are stored in an SA of a storage device (e.g., an SD card, an HDD, a USB, etc.), embodiments of the present invention provide SIFs for mapping encrypted content, control information for controlling usage of the encrypted content, and encryption/decryption keys. The SIFs make it possible for the host to more accurately acquire control information and encryption/decryption keys when consuming encrypted content. As a result, the host may securely consume encrypted content since it can accurately acquire control information and encryption/decryption key information, for consumption of encrypted content.

Embodiments of the present invention may be implemented in the form of hardware, software, or a combination of hardware and software. The software may be stored in a volatile or non-volatile memory device such as, for example, a Read-Only Memory (ROM), regardless of whether it is erasable or re-writable, in a memory such as, for example, a Random Access Memory (RAM), a memory chip, and an Integrated Circuit (IC), or in an optically/magnetically recordable and machine-readable storage medium such as, for example, a Compact Disk (CD), a Digital Versatile Disk (DVD), a magnetic disk, and a magnetic tape. A memory that can be included in a host device is an example of a machine-readable storage medium suitable to store one or more programs, including instructions implementing embodiments of the present invention. Therefore, embodiments of the present invention include programs including codes for implementing the devices and methods as set forth in the appended claims of the specification, and a machine-readable storage medium storing these programs. These programs may be electronically transferred through any media and equivalents thereof, such as communication signals, which are transferred through wired or wireless connections.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A storage device for protecting content, comprising:
 a memory device; and
 a controller that controls the memory device to store encrypted content, a control file for controlling usage of the encrypted content, a security information file including information on the control file, and a title key needed for decryption of the encrypted content,
 wherein the storage device is configured to send the security information file, the control file, the encrypted content and the title key to a host device, and the security information file includes an identifier indicating where the control file is stored in the storage device,
 wherein the security information file, the control file, and the encrypted content are stored and sent as separate files, and
 wherein the security information file further includes an initialization vector which is a value used in an encryption algorithm, the encrypted content is generated by encrypting content using the initialization vector, and the encrypted content is decrypted using the initialization vector.

2. The storage device of claim 1, wherein the security information file further includes a name of the control file.

3. The storage device of claim 1, wherein the security information file has a same name as a name of the encrypted content.

4. The storage device of claim 1, wherein the identifier includes an address where the control file is stored.

5. The storage device of claim 1, wherein the security information file has a first filename extension and the control file has a second filename extension different from the first filename extension.

6. A host device for protecting content, comprising:
 a content recording device configured to:
 write a control file for controlling usage of encrypted content to a storage device;
 read an address of a protected area in the storage device, wherein access to the protected area is available after passing authentication;
 write a title key needed for decryption of the encrypted content to the protected area at the read address;
 write the encrypted content to the storage device; and
 write, to the storage device, a security information file including information an identifier indicating where the control file is stored in the storage device,
 wherein the security information file, the control file, and the encrypted content are stored as separate files in the storage device, and
 wherein the security information file further includes an initialization vector which is a value used in an encryption algorithm, the encrypted content is generated by encrypting content using the initialization vector, and the encrypted content is decrypted using the initialization vector.

7. The host device of claim 6, wherein the security information file further includes a name of the control file.

8. The host device of claim 6, wherein the security information file has a same name as a name of the encrypted content.

9. The host device of claim 6, wherein the identifier includes an address where the control file is stored.

10. The host device of claim 6, wherein the security information file has a first filename extension and the control file has a second filename extension different from the first filename extension.

11. A host device for protecting content, comprising:
a content decryption device configured to:
read a security information file including information in a control file from a storage device;
read the control file for controlling usage of encrypted content from the storage device using the security information file;
read the encrypted content from the storage device; and
decrypt the encrypted content,
wherein the security information file includes an identifier indicating where the control file is stored in the storage device,
wherein the security information file, the control file, the encrypted content and a title key needed for decryption of the encrypted content are stored in the storage device,
wherein the security information file, the control file and the encrypted content are stored and read as separate files, and
wherein the security information file further includes an initialization vector which is a value used in an encryption algorithm, the encrypted content is generated by encrypting content using the initialization vector, and the encrypted content is decrypted using the initialization vector.

12. The host device of claim 11, wherein the security information file further includes a name of the control file.

13. The host device of claim 11, wherein the security information file has a same name as a name of the encrypted content.

14. The host device of claim 11, wherein the identifier includes an address where the control file is stored.

15. The host device of claim 11, wherein the security information file has a first filename extension and the control file has a second filename extension different from the first filename extension.

* * * * *